United States Patent
Riou et al.

(10) Patent No.: US 11,434,826 B2
(45) Date of Patent: Sep. 6, 2022

(54) ACOUSTIC TREATMENT PANEL FOR A TURBOJET ENGINE

(71) Applicant: SAFRAN AIRCRAFT ENGINES, Paris (FR)

(72) Inventors: Georges Jean Xavier Riou, Moissy-Cramayel (FR); Jeremy Paul Francisco Gonzalez, Moissy-Cramayel (FR); Jacky Novi Mardjono, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/274,558

(22) PCT Filed: Sep. 9, 2019

(86) PCT No.: PCT/FR2019/052078
§ 371 (c)(1),
(2) Date: Mar. 9, 2021

(87) PCT Pub. No.: WO2020/053514
PCT Pub. Date: Mar. 19, 2020

(65) Prior Publication Data
US 2022/0049657 A1 Feb. 17, 2022

(30) Foreign Application Priority Data
Sep. 10, 2018 (FR) ...................................... 1858101

(51) Int. Cl.
*F02C 7/24* (2006.01)
*G10K 11/172* (2006.01)

(52) U.S. Cl.
CPC .............. *F02C 7/24* (2013.01); *G10K 11/172* (2013.01); *F05D 2220/323* (2013.01); *F05D 2260/96* (2013.01); *F05D 2260/963* (2013.01)

(58) Field of Classification Search
None
See application file for complete search history.

(56) References Cited

U.S. PATENT DOCUMENTS 3,819,007 A * 6/1974 Wirt ........................ B32B 3/266
428/116
3,887,031 A   6/1975 Wirt
(Continued)

OTHER PUBLICATIONS

International Search Report dated Dec. 9, 2019 in PCT/FR2019/052078 filed on Sep. 9, 2019, 2 pages.
(Continued)

*Primary Examiner* — Courtney D Heinle
*Assistant Examiner* — Jason Fountain
(74) *Attorney, Agent, or Firm* — Oblon, McClelland, Maier & Neustadt, L.L.P.

(57) ABSTRACT

An acoustic absorption cell including a bottom wall extending in a plane orthogonal to an axial direction, an enclosure including a first axial end secured to the bottom wall, and an acoustic horn extending inside the enclosure between a first opening of the horn and a second opening of the horn smaller than the first opening, the horn being secured to a second axial end of the enclosure opposite the first axial end, and the first and second openings of the horn each extending in a plane orthogonal to the axial direction. The horn includes at least one retaining arm protruding from the horn inside the enclosure and fixed to the bottom wall or to the enclosure.

9 Claims, 3 Drawing Sheets

(56) References Cited

U.S. PATENT DOCUMENTS

| | | | | |
|---|---|---|---|---|
| 8,997,923 B2* | 4/2015 | Ichihashi | ................ | F02C 7/045 |
| | | | | 181/292 |
| 2015/0041247 A1* | 2/2015 | Ichihashi | ................ | F02C 7/045 |
| | | | | 29/896.2 |
| 2016/0032734 A1* | 2/2016 | Delapierre | ................ | F01D 5/26 |
| | | | | 415/119 |

OTHER PUBLICATIONS

French Preliminary Search Report (with English translation of Categories of Cited Documents) dated Jul. 16, 2019 in French Application 1858101 filed on Sep. 10, 2018, 3 pages.

\* cited by examiner

ACOUSTIC TREATMENT PANEL FOR A TURBOJET ENGINE

BACKGROUND OF THE INVENTION

The invention concerns an acoustic treatment panel for the absorption of sound waves, and more particularly an acoustic absorption cell of an acoustic treatment panel for the absorption of sound waves at low and medium frequencies.

The acoustic absorption cells are intended to reduce unwanted noises. This reduction is made for various reasons, for example to protect the human ear from damage or to reduce the impact of noise. In equipment and technical parts, an acoustic protection may be necessary to protect them from damage (ear fatigue). The ear fatigue can occur, for example, on the landing flaps of aircrafts in the vicinity of the engines, or on the payload components of space launch systems, due to the high noise generated during the launch.

Conventionally, the reduction in the noise of a turbojet engine, and more specifically in the noise radiated by the interaction between the rotors and their environments, is made using absorbent panels disposed at the wet surfaces of the ducts in which the sound waves propagate. It is meant by wet surfaces the surfaces in contact with a fluid flow. These panels are sandwich-type composite materials enclosing a honeycomb whose absorbent properties are partly obtained through the principle of the Helmholtz resonators formed by the honeycomb compartments forming acoustic absorption cells.

A Helmholtz resonator consists of a resonant cavity and of one or several neck(s) extending inside the cavity each from an opening formed in a wall and allowing the resonant cavity to communicate with the surrounding medium in which the waves to be attenuated propagate. The neck thus ensures communication between the ambient environment and the internal air cavity. Once the device is optimized, the neck ensures a visco-thermal dissipation effect, which corresponds to a rapid and alternating movement of the sound waves through the necks causing frictional dissipation.

In conventional treatment technologies, the length of the neck is small compared to the height of the cavity. More specifically, in conventional technologies, the length of the neck is equal to the thickness of a composite metal sheet wall (carbon+resin) which constitutes the wet surface of the treatment, because the neck is obtained by simple perforation of this wall. The operation of the Helmholtz resonator is optimized by dimensioning the air cavity so as to obtain the maximum acoustic speed at the neck. This optimization requires cavity heights on the order of a quarter of the wavelength of the main frequency to be treated. This represents for a sound wave at a frequency of 100 Hz in ambient air therefore having a wavelength of 3.4 m, a necessary cavity height of:

$$\frac{\lambda}{4} = \frac{3.4}{4} = 0.85 \text{ m}$$

It also offers very interesting properties concerning the covered large frequency bandwidth.

However, current trends for the optimization of the propulsion systems are oriented towards the decrease of the numbers of blades and the reduction of the speed of rotation of the rotating assemblies such as the fan. This results in a lowering of the frequencies of the acoustic radiation.

The optimization of the treatment panels then requires the increase of their thickness in order to be able to increase the height of the cavity and thus decrease the tuning frequency of the resonant cavities of the panels. This makes the panels incompatible with the mass and space requirement constraints associated with the new UHBR (Ultra High Bypass Ratio) type architectures.

Indeed, with nacelle sizes called thin nacelle sizes and an acoustic signature starting at particularly low frequencies, the turbojet engines with ultra high bypass ratio require the use of specific acoustic coatings. More specifically, in addition to the conventional absorbing structures treating the medium and high frequencies, there is a need for acoustic treatment which can effectively attenuate the low frequencies on the order of 500 to 800 Hz with acoustic treatment panels having a reduced space requirement.

It is always possible to dimension the Helmholtz resonator so that it is effective on lower frequencies, for a reduced radial space requirement, for example, by adjusting both the height of the neck and the volume of the resonant cavity.

The counterpart, for this type of dimensioning under the constraint of a given reduced space requirement, is that the frequency band on which the treatment acts in an optimal manner is drastically reduced when the frequency decreases.

This restriction concerning the attenuation frequency bandwidth is very detrimental, because the variation of the fan speed according to the flight phases and the mass of the aircraft generates significant evolutions of its sound emission frequency. Therefore, the treatment dimensioned in this way will be effective only for an extremely narrow speed range.

A known solution for attenuating very low frequencies with relatively thin resonators is to insert a large horn of conical or hyperbolic shape in a cavity adjusted to the dimensions of this horn, the objective here being to increase the distance traveled by the sound wave in the resonant cavity.

An aeronautical application of the acoustic absorption cells requires producing such a horn with a very thin horn wall thickness on the order of 0.1 to 0.2 mm. However, the significant acoustic excitation levels, on the order of 140 to 150 dB, and the potential mechanical vibrations generated by the engine, do not allow a horn with walls of such thickness to remain sufficiently rigid to maintain its geometry and operate in an optimal manner.

OBJECT AND SUMMARY OF THE INVENTION

The invention aims at providing an acoustic absorption cell for the absorption of sound waves at low frequencies of reduced cavity height and with a sufficiently rigid horn to maintain its geometry despite the mechanical vibrations and the acoustic excitation.

An object of the invention proposes an acoustic absorption cell comprising a bottom wall extending in a plane orthogonal to an axial direction, an enclosure including a first axial end secured to the bottom wall and an acoustic horn extending inside the enclosure between a first opening of the horn and a second opening of the horn smaller than said first opening, the horn being secured to a second axial end of the enclosure opposite the first axial end, and the first and second openings of the horn each extending in a plane orthogonal to the axial direction.

According to a general characteristic of the invention, the horn comprises at least one retaining arm protruding from the horn inside the enclosure and fixed to the bottom wall or to the enclosure.

In a first aspect of the acoustic absorption cell, the cell may further comprise a porous surface fixed to the second axial end of said enclosure and covering the first opening of the horn to constitute a duct allowing an undisturbed flow of an air stream along the surface outside the acoustic absorption cell.

In a second aspect of the acoustic absorption cell, the first opening and the second opening of the horn can have a circular or polygonal shape depending on the desired acoustic absorption frequency range.

In a third aspect of the acoustic absorption cell, the enclosure and the horn can be made of synthetic fabric impregnated with resin or of aluminum foil, and have a thickness on the order of a tenth of a millimeter to minimize the mass of the cell.

The use of such materials with such thickness allows greatly reducing the weight of the acoustic absorption cell.

In a fourth aspect of the acoustic absorption cell, the horn can comprise a tubular neck with a section corresponding to the second opening of the horn, and a hyperbolic portion extending between the first opening and the neck, the neck comprising at least two retaining arms fixed to a free end of the neck and to the bottom wall of the acoustic cell, the retaining arms being spaced apart from each other to define free gaps.

Such a horn configuration particularly narrow and elongate thanks to the presence of a tubular neck allows providing an absorption cell treating the low frequencies over a relatively wide frequency range while having a cell height corresponding to the absorption cells conventionally authorized for the aircraft acoustic treatment panels.

Another object of the invention proposes an acoustic treatment panel intended to be disposed on at least one wall of an aircraft in contact with a fluid flow, the panel comprising a plurality of acoustic absorption cells as defined above.

Yet another object of the invention proposes a turbojet engine comprising at least one acoustic treatment panel as defined above.

Another object of the invention proposes an aircraft comprising at least one turbojet engine as defined above.

BRIEF DESCRIPTION OF THE DRAWINGS

The invention will be better understood upon reading the following, by way of indication but without limitation, with reference to the appended drawings in which.

DETAILED DESCRIPTION OF EMBODIMENTS

Figure 1:
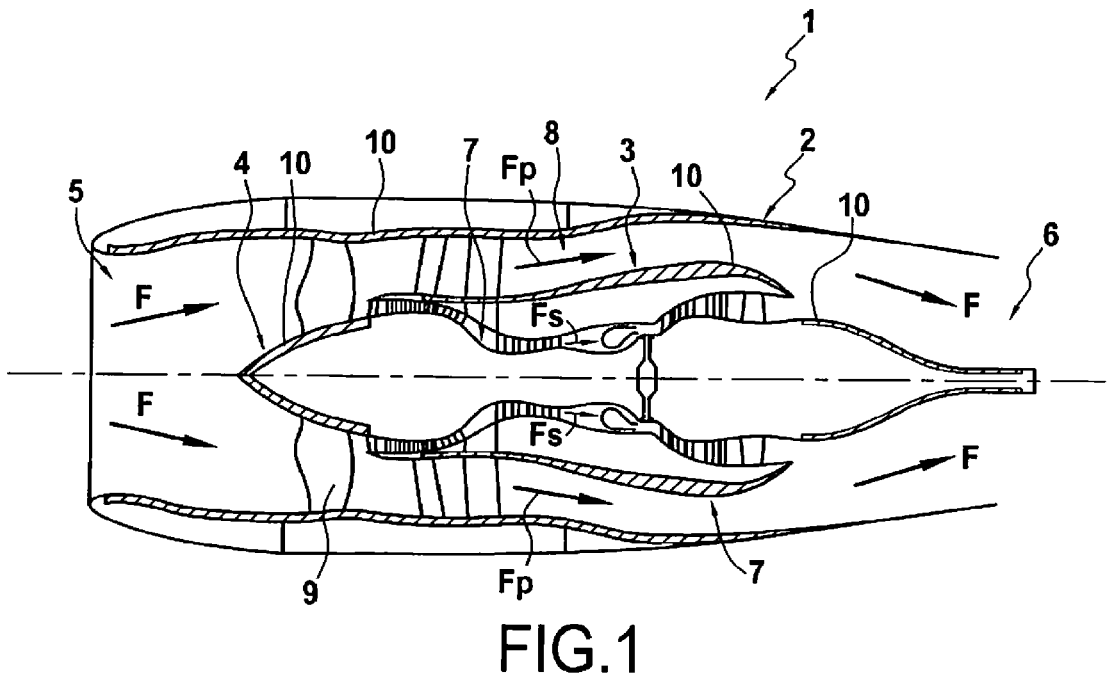
FIG. 1 presents a sectional view of a turbojet engine according to one embodiment of the invention, in a longitudinal plane of the turbojet engine.

FIG. 1 represents a sectional view of a turbojet engine 1 according to one embodiment of the invention, in a longitudinal plane of the turbojet engine 1.

The turbojet engine 1 comprises a nacelle 2, an intermediate casing 3 and an inner casing 4. The nacelle 2 and the two casings 3 and 4 are coaxial. The nacelle 2 defines at a first end a fluid flow inlet channel 5 and at a second end, opposite the first end, a fluid flow exhaust channel 6. The nacelle 2 and the intermediate casing 3 delimit therebetween a primary fluid flowpath 7. The intermediate casing 3 and the inner casing 4 delimit therebetween a secondary fluid flowpath 8. The primary flowpath 7 and the secondary flowpath 8 are disposed along an axial direction of the turbojet engine between the inlet channel 5 and the exhaust channel 6.

The turbojet engine 1 further comprises a fan 9 configured to deliver an air stream F as a fluid flow, the air stream F being divided at the outlet of the fan into a primary stream $F_P$ circulating in the primary flowpath 7 and into a secondary stream $F_S$ circulating in the secondary flowpath 8.

The turbojet engine 1 further comprises at least one acoustic treatment panel 10 configured to attenuate the acoustic waves emitted by the turbojet engine before these waves escape radially outside the nacelle 2 of the turbojet engine 1.

Each acoustic treatment panel 10 is configured to attenuate acoustic waves whose frequency belongs to a predetermined frequency range. In the embodiment illustrated in FIG. 1, the acoustic treatment panels 10 are integrated to the nacelle 2, to the intermediate casing 3 and to the inner casing 4. On the inner casing 4, the acoustic treatment panels 10 are integrated, on the one hand, on the portion upstream of the intermediate casing 3 along the axial direction and in particular on the portion carrying the fan 9 and, on the other hand, on a portion downstream of the intermediate casing 3.

Figure 2:
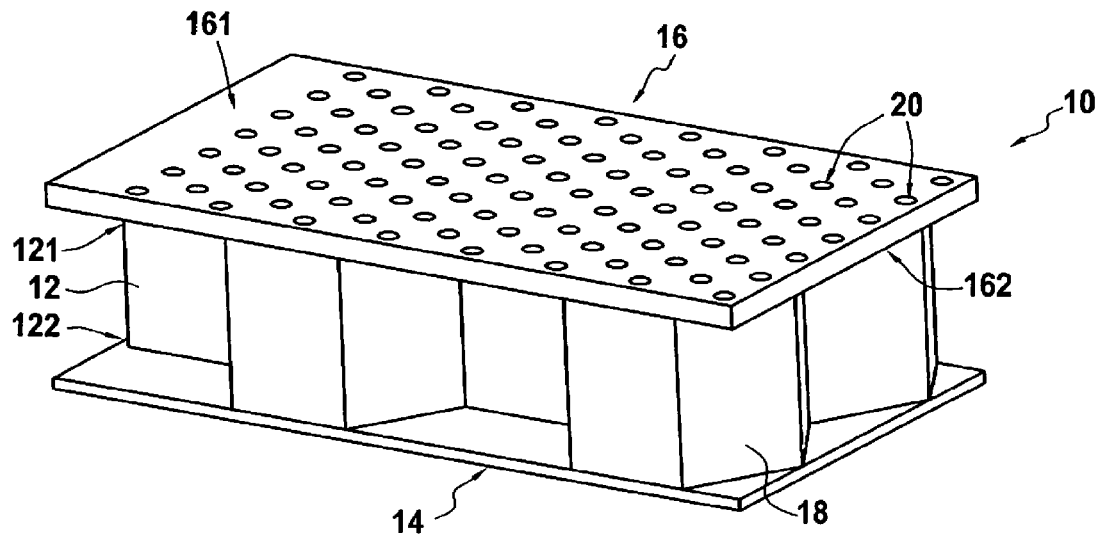
FIG. 2 illustrates a partial perspective view of an acoustic treatment panel according to one embodiment of the invention.

FIG. 2 represents a partial perspective view of an acoustic treatment panel 10 according to one embodiment of the invention.

Referring to FIG. 2, the acoustic treatment panel 10 includes a core 12, a reflective layer 14 and an input layer 16.

The core 12 has a honeycomb structure. More specifically, the core 12 includes a plurality of acoustic compartments 18, or compartments, arranged along a known honeycomb structure.

Each compartment 18 opens onto a first face 121 of the core 12 and onto a second face 122 of the core 12 located opposite the first face 121.

The first face 121 of the core 12 is intended to be oriented towards the primary 7 or secondary 8 air flowpath depending on the location of the acoustic treatment panel 10. The second face 122 of the core 12 is intended to be oriented away from the air flowpath.

According to the embodiment, the core 12 can be made of metal, or of a composite material, such as a composite material formed of carbon fibers embedded in a hardened resin matrix.

The reflective layer 14 is adapted to reflect acoustic waves having a frequency belonging to the predetermined frequency range.

The reflective layer 14 extends facing the second face 122 of the core 12, by being in contact with the second face 122. More specifically, the reflective layer 14 is secured to the second face 122 of the core 12, for example bonded to the second face 122 of the core 12.

According to the embodiment, the reflective layer 14 can be made of metal or of a composite material, such as a composite material formed of carbon fibers embedded in a hardened resin matrix. In one variant, the layer forming the bottom of the compartments 18 may be non-reflective.

The input layer 16 extends facing the first face 121 of the core 12, by being in contact with the first face 121. More specifically, the input layer 16 is secured to the first face 121 of the core 12, for example bonded to the first face 121 of the core 12.

The input layer 16 is a perforated one-piece plate comprising a plurality of openings 20 passing through the input layer 16 from the first face 161 to the second face 162 of the input layer 16. Each opening 20 opens onto a compartment 18 of the core 12, several openings 20 being able to open onto the same compartment 18.

Figure 3:
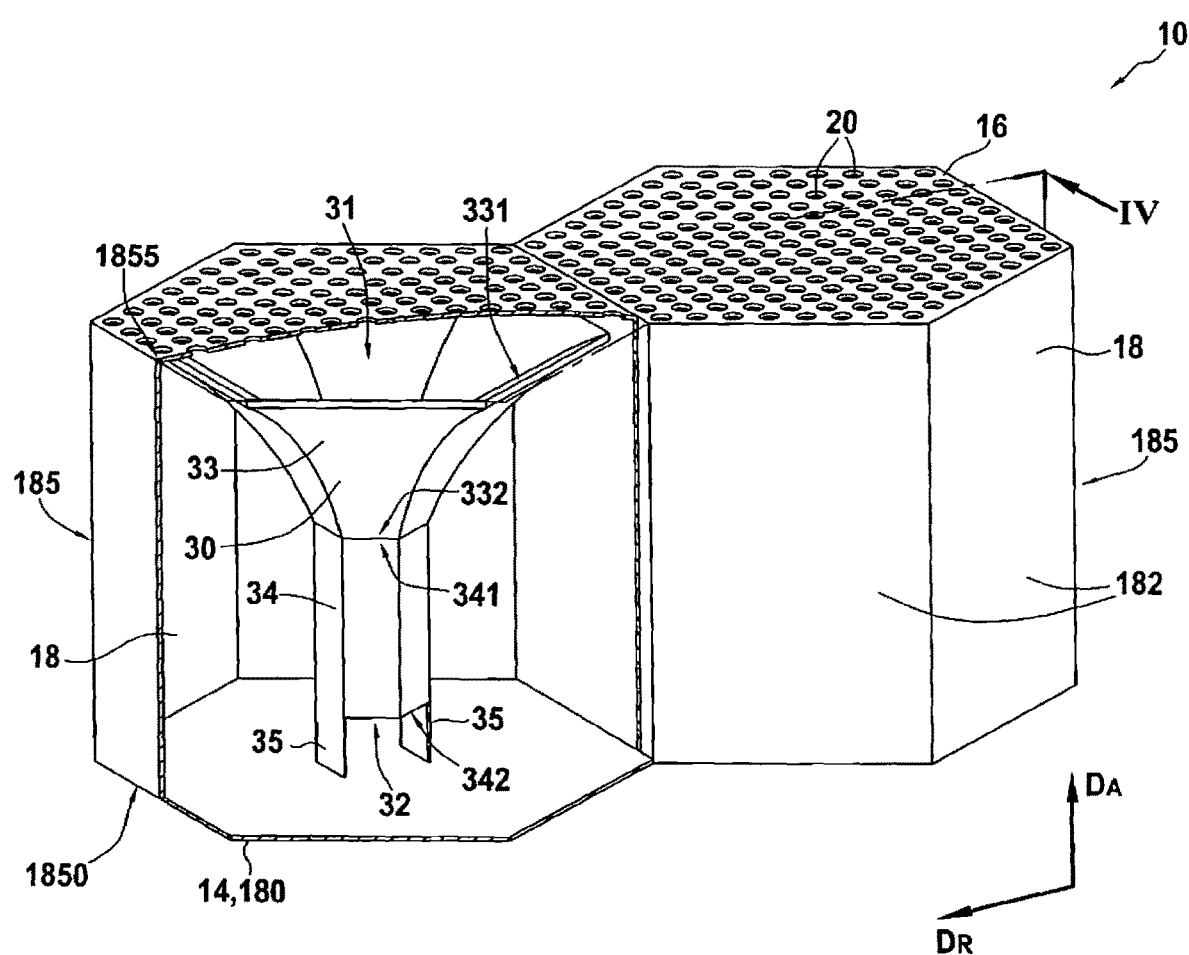
FIGS. 3 and 4 schematically present a perspective view and a sectional view of an acoustic absorption cell according to a first embodiment of the invention.
Figure 4:
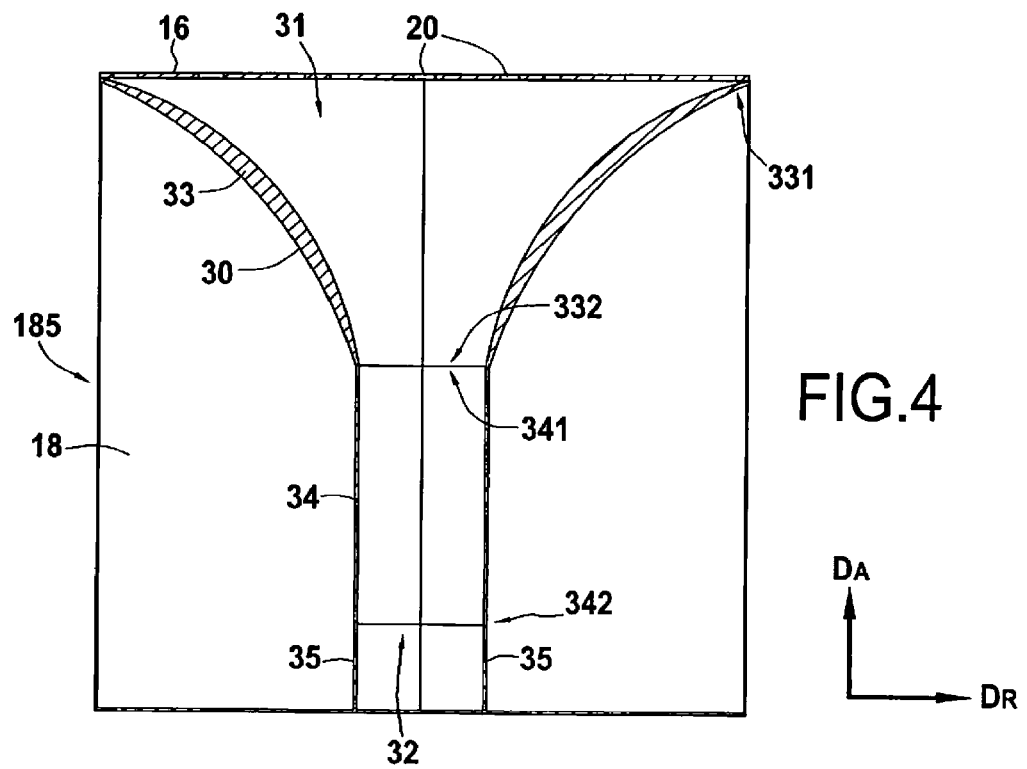

FIGS. 3 and 4 schematically represent a perspective view and a sectional view of an acoustic absorption cell according to one embodiment of the invention.

Each compartment 18 of the core 12 of the acoustic treatment panel 10 comprises a bottom wall 180 formed from the reflective layer 14 and six side walls 182 of rectangular shape consisting of a material of thicknesses of 1 to 2 tenths of a millimeter at most. The six side walls 182 protrude from the bottom wall 180 in a direction orthogonal to the plane in which the bottom wall extends. The six side walls 182 are arranged together to form a tubular enclosure 185 with a hexagonal base defining an axial direction $D_A$ coincident with the axis of revolution of the enclosure 185 and a radial direction $D_R$ in which the bottom wall extends. The enclosure 185 comprises, in the axial direction $D_A$, a first axial end 1850 secured to the bottom wall 180 and a second axial end 1855 secured to the porous plate forming the input layer 16.

Inside its enclosure 185, each compartment 18 comprises a horn 30 including a first inlet opening 31, a second outlet opening 32, a hollow pyramidal portion 33 with a hexagonal base and a neck 34. The first opening 31 has a section larger than the section of the second opening 32, the openings 31 and 32 extending in a radial plane comprising the radial direction $D_R$, and therefore parallel to the plane in which the bottom wall extends. The first opening 31 extends more particularly in a plane comprising the second axial end 1855 of the enclosure 185.

The neck 34 has a tubular shape with a hexagonal base having, all along the neck, an opening corresponding to the second opening 32. The pyramidal portion 33 of the horn is comprised between the first opening 31 and the neck 34, and the inner space of the pyramidal portion 33 fluidly communicates with the inner space of the neck 34. The pyramidal portion 33 comprises, in the axial direction $D_A$, a first end 331 having as section the first opening 31 and a second end 332 having as section a section corresponding to that of the second opening 32. The horn 34 includes, in the axial direction $D_A$, a first end 341 secured to the second end 332 of the pyramidal portion, and a second end 342 disposed facing the bottom wall 180.

The horn 30 is fixed to the rest of the compartment 18 at two different heights in the axial direction $D_A$. The first end 331 of the pyramidal portion 33 is fixed to the second axial end 1855 of the enclosure 185 and, in the embodiment illustrated in FIGS. 3 and 4, the second end 342 of the neck 34 is fixed to the bottom wall 180 via retaining tabs 35 extending in the axial direction $D_A$.

Figure 5:
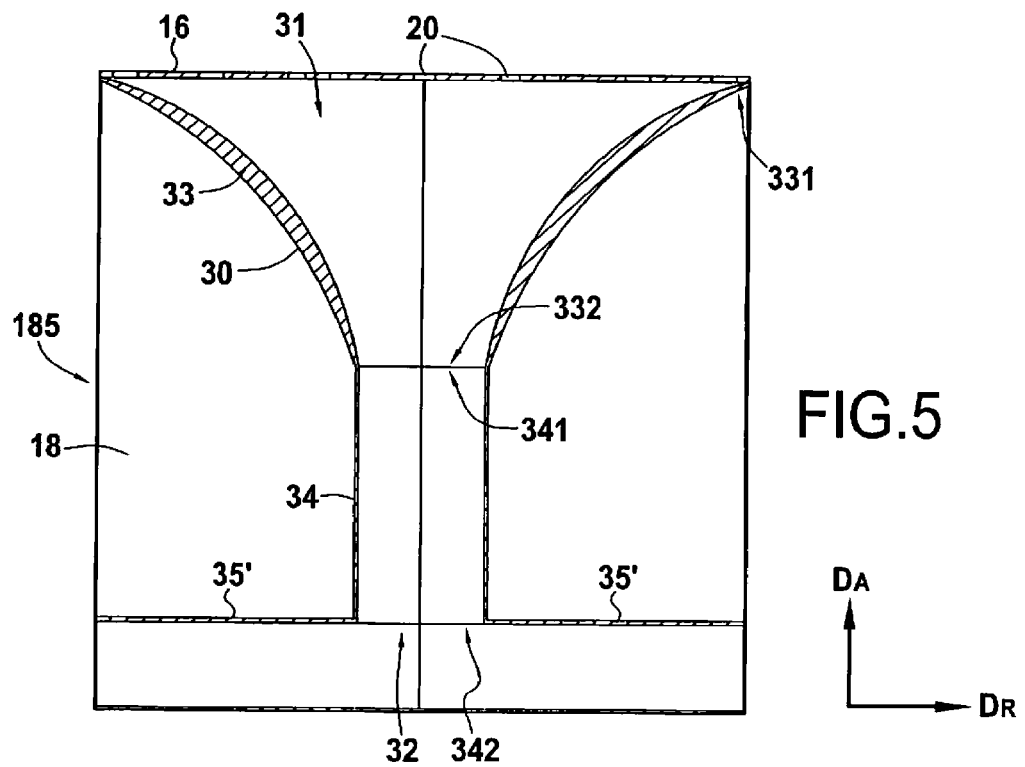
FIG. 5 schematically presents a sectional view of an acoustic absorption cell according to a second embodiment of the invention.

FIG. 5 schematically represents a sectional view of an acoustic absorption cell according to a second embodiment of the invention. In this variant, the horn 30 is fixed to the compartment 18 through fixing the first end 331 of the pyramidal portion 33 to the second axial end 1855 of the enclosure 185 and through fixing the neck 34 to the enclosure 185 via a plurality of tabs 35' extending in the radial direction $D_R$. In the example illustrated in FIG. 5, the radial tabs 35' extend in the radial direction $D_R$ from the second end 342 of the neck 34.

In the embodiment illustrated in FIGS. 3 and 4, each horn 30 inserted in a compartment 18 is held by a bonding to its two axial ends, that is to say to the first end 331 of the pyramidal portion 33 and to the second end 342 of the neck 34.

The choice of the number of tabs 35 or arms as well as their width depends on the mechanical strength of the desired structure, on the geometry of the horn and/or on the mechanical properties of the materials used.

The modification of the environment of the second outlet opening 32 of the horn 30 affects the operation of the acoustic compartment 18. It must be taken into account in the acoustic optimization process. Indeed, the addition of the tabs 35 reduces the section of passage of the waves in the concerned area. It was noted that to compensate for this modification, it is necessary:

to increase, compared to a horn devoid of retaining tabs 35 at the second end 342 of the neck 34, the distance between the second neck end 342 and the bottom wall 180 of the acoustic compartment 18 by reducing the length of the neck 34 in the axial direction $D_A$, the height in the axial direction $D_A$ of the core 12 being fixed based on the maximum space requirement available, and to adapt the geometry of the horn by slightly reducing its section at the second end 332 of the pyramidal portion 33 to maintain the tuning frequency of the compartment 18 given that the neck 34 is shorter.

In variants, the horn 30 and neck 34 shapes may be adapted to the shape of the retained acoustic compartment 18. Various horn shapes can therefore be envisaged such as for example cylindrical, rectangular, square or ovoid shapes.

The invention allows, among other things, industrializing the concept of a cone resonator for an aeronautical application by ensuring the mechanical strength and the acoustic performance by the addition of retaining arms.

The invention claimed is:

1. An acoustic absorption cell comprising:
   a bottom wall extending in a plane orthogonal to an axial direction;
   an enclosure including a first axial end secured to the bottom wall; and
   an acoustic horn extending inside the enclosure between a first opening of the horn and a second opening of the horn smaller than said first opening, the horn being secured to a second axial end of the enclosure opposite the first axial end, and the first and second openings of the horn each extending in a plane orthogonal to the axial direction,
   wherein the horn comprises a tubular neck with a section corresponding to the second opening of the horn, and a hyperbolic or pyramidal portion extending between the first opening and the neck, the neck comprising at least two retaining arms protruding from the horn inside the enclosure and fixed to a free end of the neck and to the bottom wall or to the enclosure of the acoustic cell, the retaining arms being spaced apart from each other to define at least two free gaps.

2. The acoustic absorption cell according to claim 1, further comprising a porous surface fixed to the second axial end of said enclosure and covering the first opening of the horn.

3. The acoustic absorption cell according to claim 1, wherein the first opening and the second opening of the horn have a circular or polygonal shape.

4. The acoustic absorption cell according to claim 1, wherein the enclosure and the horn are made of synthetic fabric impregnated with resin or of aluminum foil, and have a thickness on the order of a tenth of a millimeter.

5. An acoustic treatment panel intended to be disposed on at least one wall of an aircraft in contact with a fluid flow, the panel comprising a plurality of acoustic absorption cells according to claim 1.

6. A turbojet engine intended to be mounted on an aircraft, the turbojet engine comprising at least one acoustic treatment panel according to claim 5.

7. An aircraft comprising at least one turbojet engine according to claim 6.

8. The acoustic absorption cell according to claim 1, wherein the arms extend axially and are fixed to the bottom wall.

9. The acoustic absorption cell according to claim 1, wherein the arms extend radially and are fixed to the enclosure.

\* \* \* \* \*